(12) United States Patent
Benton et al.

(10) Patent No.: US 10,683,617 B2
(45) Date of Patent: Jun. 16, 2020

(54) WALL COVERING AND METHOD OF PRODUCING THE SAME

(71) Applicant: AHLSTROM CORPORATION, Helsinki (FI)

(72) Inventors: Douglas McKee Benton, Northampton, MA (US); Erkki Laiti, Pont-Evêque (FR); Hootan Farhat, Somerville, MA (US); Noah Tremblay, Pepperell, MA (US); Madeline Vara, Atlanta, GA (US); Xinhua Li, Newton, MA (US); Olivier Schueller, Arlington, MA (US)

(73) Assignee: Ahlstrom-Munksjö Oyj, Helsinki (FI)

( * ) Notice: Subject to any disclaimer, the term of this patent is extended or adjusted under 35 U.S.C. 154(b) by 497 days.

(21) Appl. No.: 15/311,287

(22) PCT Filed: May 15, 2015

(86) PCT No.: PCT/FI2015/050338
§ 371 (c)(1),
(2) Date: Nov. 15, 2016

(87) PCT Pub. No.: WO2015/173476
PCT Pub. Date: Nov. 19, 2015

(65) Prior Publication Data
US 2017/0107670 A1    Apr. 20, 2017

(30) Foreign Application Priority Data
May 15, 2014  (FI) ..................... 20145443

(51) Int. Cl.
| | | |
|---|---|---|
| *D21H 27/20* | (2006.01) | |
| *C09J 7/21* | (2018.01) | |
| *C09J 133/02* | (2006.01) | |
| *C09J 7/30* | (2018.01) | |

(52) U.S. Cl.
CPC ............... *D21H 27/20* (2013.01); *C09J 7/21* (2018.01); *C09J 7/30* (2018.01); *C09J 133/02* (2013.01); *C09J 2201/122* (2013.01); *C09J 2201/622* (2013.01); *C09J 2400/263* (2013.01); *C09J 2409/001* (2013.01); *C09J 2433/00* (2013.01); *C09J 2433/001* (2013.01)

(58) Field of Classification Search
None
See application file for complete search history.

(56) References Cited

U.S. PATENT DOCUMENTS

| | | | |
|---|---|---|---|
| 3,663,269 A | 5/1972 | Fischer et al. | |
| 4,355,074 A | 10/1982 | Stemmler et al. | |
| 4,361,452 A | 11/1982 | Clarke et al. | |
| 4,639,395 A | 1/1987 | Clarke et al. | |
| 6,280,840 B1 * | 8/2001 | Luhmann ................... | C09J 7/26 428/343 |
| 6,552,118 B2 * | 4/2003 | Fujita ........................ | C08F 8/42 106/287.1 |
| 2005/0256254 A1 * | 11/2005 | Luhmann ............... | C09J 153/02 524/555 |
| 2007/0031637 A1 * | 2/2007 | Anderson ............. | A61F 13/534 428/131 |

FOREIGN PATENT DOCUMENTS

| | | |
|---|---|---|
| EP | 0 008 213 | 2/1980 |
| EP | 0 194 857 | 9/1986 |
| WO | WO 95/02021 | 1/1995 |
| WO | WO 95/27826 | 10/1995 |
| WO | WO 00/31201 | 6/2000 |
| WO | WO 2005/095712 | 10/2005 |

OTHER PUBLICATIONS

International Search Report for PCT/FI2015/050338, dated Sep. 15, 2015, 4 pages.
International Type Search Report for ITS/FI2014/001, dated Aug. 27, 2014, 5 pages.
Search Report for FI 20145443, dated Nov. 28, 2014, 2 pages.

\* cited by examiner

*Primary Examiner* — Frank D Ducheneaux
(74) *Attorney, Agent, or Firm* — Laine IP Oy

(57) ABSTRACT

A wall covering, a method of producing it and a method of covering a wall. The wall covering comprises a planar substrate, such as a nonwoven base substrate, having a front, and a back facing opposite the front. There is a barrier layer on the back of the substrate and an adhesive layer superimposed on the barrier layer. The adhesive layer comprises a first polymer component, a second polymer component, the first polymer component being a non crosslinked polymer and said second polymer component being a crosslinked polymer exhibiting properties of superabsorbency. The adhesive exhibits when exposed to water, a strength sufficient for binding to a wall substrate and a glide resistance low enough for allowing repositioning of the wall cover by sliding the wallcover on the wall without having to lift it up over a period of time of at least 5 minutes.

35 Claims, 1 Drawing Sheet

WALL COVERING AND METHOD OF PRODUCING THE SAME

This application is the U.S. national phase of International Application No. PCT/FI2015/050338 filed 15 May 2015, which designated the U.S. and claims priority to FI Patent Application No. 20145443 filed 15 May 2014, the entire contents of each of which are hereby incorporated by reference.

TECHNICAL FIELD

The present invention relates to wall coverings and to methods of producing them. In particular the present invention concerns a wall covering which comprises a non-woven substrate with a barrier layer on the back side and an adhesive layer on the barrier layer.

The present invention also concerns a method of at least partially covering the surface a wall.

BACKGROUND ART

Adhesives for wall coverings are typically based on pre-pasted CMC and Starch, CMC+Starch, or pressure sensitive adhesive formulations. For example, U.S. Pat. No. 4,355,074 discloses the use of a swellable polymer, NaCMC, as an adhesive.

However, conventional wall coverings do not currently provide adhesion and repositionability by spraying water to the wall surface.

Alternative adhesive compositions are known in the patent literature. Thus, U.S. Pat. No. 4,361,452 discloses an aqueous adhesive used in wall coverings. The patent provides for adhesives containing water insoluble but water absorbable polymeric micro-particle having a diameter in the range of 0.2 and 6 microns when dry. It is suggested that wall paper adhesives formulated from water swellable but water insoluble synthetic polymeric materials will give good bond strength and that it is possible to reduce the viscosity of the coating formulation to levels acceptable for wallpaper adhesives by including water soluble polymeric material in the composition.

U.S. Pat. No. 4,476,190 discloses an adhesive layer for a wall paper which comprises cationic and anionic water absorbent particles that are insoluble in water in order to produce an adhesive layer that is initially not in contact with the wall surface until the wall paper is pressed into the wall and the water absorbent particles are crushed. The adhesive then becomes in contact with the wall and the wall paper is adhered to the wall. The document teaches that the polymeric materials can be made swellable by the inclusion of N,N¹-methylene bisacrylamide.

Due to the chemical nature of the polymers used in U.S. Pat. No. 4,476,190, they must be dispersed to the paper substrate by adding them directly into the paper using and organic dispersant, such as kerosene. The carrier must be sufficiently volatile so as to evaporate without water as water will cause the particles to swell prematurely.

WO2000/031201 discloses a self-adhesive wall covering that includes a moisture bather. The self-adhesive wall covering is composed of a dry adhesive with elastic, fragile micro-particles suspended in it. The micro-particles may include solid or hollow glass particles whose largest size is larger than the thinnest portion of the adhesive layer. This insures that at least some of the particles project above the adhesive layer. When the wall paper is in place is pressed into the wall, the spheres break and the adhesive is activated by the pressure and the fact that a large portion of the paper surface has adhesive in contact with the wall. The crushable particles will be permanently deformed when pressed against the wall.

The moisture bather protects the wall paper from high humidity environments but not from water used to activate the adhesive. The known wall covering is not activated by water.

Further art is represented by EP 0194857, U.S. Pat. No. 4,639,395, WO 9527826, WO 2005095712 and U.S. Pat. No. 3,883,269.

As apparent from the foregoing overview, the wall covering adhesives proposed so far are deficient in many aspects. The compositions suggested are complex, requiring a number of components, and elaborate techniques are needed for application of the adhesive layer on the back side of the wall covering. Further, the studied compositions contain components which are irreversibly changed after application of the wall covering against the desired surface which makes it difficult to remove wall coverings once they have adhered to the surface.

A further problem is the lack of properly working moisture barriers which will allow for wetting of the adhesive and subsequent efficient drying, while still protecting the substrate layer of the wall covering.

SUMMARY OF INVENTION

Technical Problem

It is an aim of the present invention to provide a novel repositionable wall covering that provides adhesion and repositionability.

It is another aim of the present invention to provide a novel wall covering that provides adhesion and repositionability by spraying water to the wall surface.

It is a further aim to provide an industrially applicable method of producing a novel repositionable wall covering.

It is a fourth aim of the present invention to provide a method of covering wall surfaces with substrate layers composed of natural or synthetic fibres.

Solution to Problem

The present invention is based on the idea of providing a planar, flat substrate, formed by a, typically porous, sheet or web. A bather layer is formed on the back side of the substrate, and an adhesive layer is applied on the bather layer. The adhesive layer comprises a first polymer component and a second polymer component, the first polymer component being a non crosslinked polymer and said second polymer component being a crosslinked polymer. The second crosslinked polymer component is, preferably, an expandable portion capable of rapidly absorbing water.

The present adhesive exhibits when exposed to water, a strength sufficient for binding to a wall substrate and a glide resistance low enough for allowing repositioning of the wall cover by sliding the wallcover on the wall without having to lift it up over a period of time of at least 5 minutes.

The method of producing a wall covering comprises the step of providing an adhesive composition which comprises a first non crosslinked polymer component and a second crosslinked polymer component which is a superabsorbent, the composition optionally containing additives that help to modify the end properties of the adhesive composition.

The novel wall covering allows for an advantageous method of covering a wall, which comprises the steps of providing a wall covering having an adhesive exhibiting portions capable of expanding with water;

moistening the adhesive with water to allow swelling of the expandable portion;

contacting the back of the wall covering at a position at a first point of time; and optionally changing the position of the sheet against the wall by sliding the wallcover on the wall without having to lift it up during up to 30 minutes, preferably 1 to 20 minutes, in particular 5 to 10 minutes from the first point of time.

More specifically, the present wall covering is characterized by what is stated in the characterizing part of claim 1.

The method according to the present invention is characterized by what is stated in the characterizing part of claim 22.

The method according to the present invention for covering a wall surface is characterized by what is stated in the characterizing part of claim 37.

Advantageous Effects of Invention

Considerable advantages are obtained by the present invention. Thus, the polymer portions of the present adhesive layer have properties of superabsorbency, typically having the ability to absorb large quantities of water, and they are reversibly swellable, i.e. the polymers will swell upon wetting and shrink upon drying. The disclosed combination of substrate, bather and adhesive will therefore provide for a wall covering able to slide and be repositioned on the wall, without removing or peeling it off from the wall surface that uses water as an activator. Compared to the art, the present invention uses fewer components and represents an improvement over the known wall coverings.

The invention described here presents a unique way of avoiding the use of a two component system; and of providing a way to achieve a low viscosity coating mixture allowing for a broad range of coating application methods (not just high viscosity methods like screen coating). In fact, a wall covering of the instant kind can be produced on an industrial scale, for example by continuous processing on a paper machine combined with suitable coaters.

The present technology represents a generalized way of providing for low viscosity coating mixtures for adhesive compositions—for example by using a crosslinked component that does not cure until dry; or a material that does not swell until its pH is adjusted by, for example, applying neutralizing coating.

The invention also allows the use of high solids solutions while minimizing the amount of water needed to be removed to dry the coating.

The barrier of the present wall covering has several advantageous effects. The first effect is that the barrier layer acts to slow down the transport of the adhesive solution into the nonwoven during coating allowing it to stay near the surface of the back side. A second advantage of the barrier is it slows down the water via limiting wicking yet is still permeable and allows the water to slowly evaporate in the form of water vapor (Tappi TM 161. Gurley Air Porosity value 1-150 L/min/100 $cm^2$, preferably 8-20 L/min/100 $cm^2$). A third advantageous effect of the barrier is to limit the possibility of curling of the substrate, such as a nonwoven substrate, due to expansion and contraction of the adhesive layer. The fourth advantage of the barrier layer is to improve strippability, the ability to remove the wallcover from the wall in one piece. It does this by limiting the amount of adhesive that penetrates into the substrate, so the substrate does not delaminate during removal off the wall. Instead the delamination takes place within the adhesive layer between the wall and barrier layer, and not within the fibrous substrate.

The present invention gives rise to a wall covering which is readily handled by both professionals and non-skilled persons and allows for the use in domestic remodelling.

The wall covering can be attached to the intended surface, for example a wall, using a small amount of water, and after coming in contact with the wall, the wall covering can be slid along the wall to a final position. The position can be changed within a working time of at least several minutes. Then, over a reasonably brief period of time, such as half an hour up to roughly 12 hours, the adhesive is set. It is a further important consideration that the wall covering according to the present invention can be removed easily, for example by wetting the surface and by lifting the wall covering away in the dry state without the need for applying additional water.

EMBODIMENTS

Figure 1:
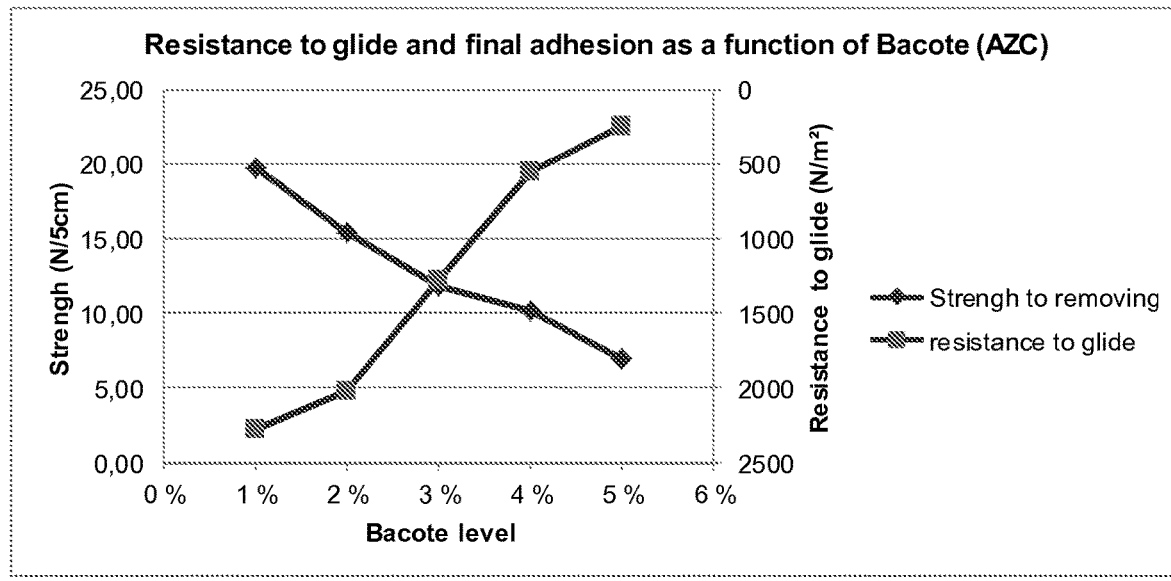
FIG. 1 shows the relationship between the content of a crosslinking agent and the final adhesive properties of a partially crosslinked aqueous polyacrylic acid composition.

As discussed above, a wall covering according to the present technology comprises a non-woven or paper substrate or a similar planar substrate having a front, and a back side facing opposite the front. It further comprises a barrier layer on the back side of the substrate and, on the barrier layer, an adhesive layer opposite to the substrate.

Generally, the substrate is comprised of cellulosic and/or polymeric fibers bonded together either thermally, mechanically or with chemically with a binder.

In one embodiment, the planar substrate, which forms the outer layer of the product, is a standard wall cover of the kind that may absorb water. The wall cover for example comprises a nonwoven substrate or a paper, a board or a similar sheet or a web, which can be produced by wet laid technologies. In the present context, "wet laid technology" comprises manufacture involving the steps of dispersing fibers in water, and draining, retaining and consolidating them randomly on a wire, then drying and bonding the fibers together). Various other planar substrates are also possible.

The substrate can be formed from fibres selected from the group consisting of natural fibres, synthetic fibres and mixtures thereof. The thickness of the substrate can vary broadly between about 0.1 to 5 mm, in particular 0.5 to 3 mm. The surface weight (grammage) can vary in the range of about 30 to 500 $g/m^2$. Both the thickness and grammage values given refer to uncoated substrates.

Typically, the substrate is porous, i.e. it is permeable to air and water.

The substrate is covered on the back side, i.e. the wall side, with a barrier layer.

As indicated above, the barrier layer achieves one or several of the following objects: a first object of the barrier layer is to slow down the transport of the adhesive solution into the nonwoven during coating allowing it to stay close to the surface of the back side. A second objective is it slows down the water via limiting wicking yet be permeable to allow the water to evaporate in the form of vapour. A third object of the barrier is to limit the possibility of curling of the nowoven, due to expansion and contraction of the adhesive layer. A fourth object of the barrier layer is to improve strippability, the ability to remove the wallcover from the wall in one piece.

Naturally, the barrier layer may achieve other effects also—for example the layer may improve mechanical properties, such as tensile strength, of the substrate layer, and it may have a stiffening effect thereon. The barrier layer may also, depending on its composition, improve opacity of the substrate layer.

In one embodiment, the barrier layer comprises a binder, preferably a polymeric binder, for example a cross-linked polymer. The binder can be of a conventional type for coating colours. Examples include styrene butadiene rubber and acrylic binders.

The barrier layer also comprises a pigment which confers barrier properties to the layer. Examples suitable pigments include plate-like pigments, such as kaolin clay, delaminated clay, engineered clay, talc and combinations thereof. The aspect ratio of the pigment is typically 60 to 200. Naturally, the barrier layer may also comprise other (non-plate-like) pigments and fillers, which in particular modify the flow properties of the layer. The concentration of the pigment is suitable 5 to 70% calculated from the dry weight of the barrier layer.

The barrier layer can be applied on the back of the substrate for example by gravure, roll coat, Meyer rod, and saturation, screen, spray, blade and air knife coating on the substrate a coating formulation comprising a binder and at least one plate-like pigment, capable of forming a barrier layer which is impermeable to water but permeable to vapour.

Basically, the barrier layer thus achieve is water resistant (or water impermeable) while still being permeable to vapour, such as water steam. In one embodiment, the barrier layer has a COBB60 value in the range of 3 to 130 gsm, preferably in the range of 15 to 50 gsm, as determined using T441 om-90.

A third layer, superimposed on the barrier layer and, thus, positioned on the opposite side of the barrier layer with respect to the substrate, is formed by the adhesive layer. The third layer is intended for contacting the wall and will provide adhesion between the barrier-laden substrate and the surface of the wall.

In one embodiment, the adhesive layer covers the whole surface, or at least more than 90%, of the barrier layer on the substrate.

In another embodiment, the adhesive layer covers a part, for example 10 to 90%, of the surface of the barrier layer. In a further embodiment, the adhesive layer is applied in the form of discrete patterns, such as stripes or spots on the barrier layer.

For specific embodiments, which are intended merely partially attaching a substrate on the wall, the adhesive layer may cover 1 to 9% of the surface of the barrier layer.

Typically, the adhesive layer comprises a first polymer component and a second polymer component, the first polymer component being a non crosslinked polymer and the second polymer component being a crosslinked polymer exhibiting properties of superabsorbency.

In the present context the term "crosslinked" refers generally to the capability of a polymer of forming a film. Thus, in one aspect, the terms "crosslinked" and "having film forming capability" can be used interchangeably. The term "non crosslinked", by contrast, then signifies that the polymer as such, without chemical or physical alternation, is soluble in a medium rather than having the capability of forming a film in the same ambient.

The first polymer component of the adhesive layer is preferably selected from water soluble polymers, in particular it is selected from water soluble polymers which contain ionic or ionizable functional groups or functional groups capable of hydrogen bonding or combinations thereof.

The second polymer component of the adhesive layer preferably contains ionic or ionizable functional groups, such as metal carboxylates or carboxylic acids, or ammonium halides or amino groups, or combinations thereof.

Any ionic functional groups of the uncrosslinked polymer component impart water solubility. Thus, ionic functional groups on the first polymer component may help with enabling a quick dissolve of the adhesive. Ionic functional groups of the crosslinked polymer impart water absorbency or superabsorbency.

The polymer composition of the adhesive layer can be arrived at by several methods.

Thus, in a first embodiment, mixtures of first and second polymer components, of the kind discussed above, are provided. Typically, the weight ratio between the components mixed with each other are on the order of 1:100 to 100:1, preferably about 1:50 to 50:1, in particular 1:10 to 10:1. In order to adjust viscosity, suitably dilute aqueous solutions/dispersions are applied.

In a second embodiment, a suitable adhesive composition is obtained by the steps of mixing a water-soluble polymer with a crosslinking agent; and restricting crosslinking of the water-soluble polymer so as to form a composition comprising a first non crosslinked polymer component and a second crosslinked polymer component. The water-soluble polymers used in this embodiment can basically be selected from the ones mentioned above, however with requirement that it should contain crosslinkable functional groups that may or may not be ionic or ionizable.

Subject to the step of carrying out a restricted crosslinking, the adhesive composition will be formed by partially crosslinked polymers, i.e. it contains a first noncrosslinked polymer component and a second crosslinked polymer which is derived from the first polymer component by crosslinking. The crosslinking is carried out such that a mixture of first and second polymer components is obtained wherein the weight ratio between the components is similar to that mentioned above, in connection with the first embodiment, i.e. the ratio of the first to the second polymer component is on the order of 1:100 to 100:1, preferably about 1:50 to 50:1, in particular 1:10 to 10:1.

In a third embodiment, a mixture of the first and second polymer components (the polymers being of the above kind discussed above) is deposited onto the non-woven from a low viscosity solution by an adjustment of the pH of the solution. Thus, a mixture of a first non crosslinked polymer and a second crosslinked polymer is deposited onto the bather layer of the substrate at a first pH value, and after deposition, the pH is adjusted to a second pH value such as to achieve properties of superabsorbency of the second polymer.

In the case of carboxylic acid containing first and second components, the pH is in the acidic range in order to impart a low viscosity. After the mixture is deposited onto the non-woven, the pH is adjusted by depositing an acidic or alkaline solution to reinstate the superabsorbency of the second polymer component.

In the case of carboxylic acid containing first and second components, the pH could be adjusted by an alkaline solution, for example an aqueous solution of sodium bicarbonate. The pH adjustment solution can be applied before or after the adhesive mixture is dried. This embodiment is particularly suitable for cases where an aqueous adhesive mixture containing a superabsorbent polymer is too viscous for facile manufacturing.

The ratio of the first to the second polymer component is on the order of 1:100 to 100:1, preferably about 1:50 to 50:1, in particular 1:10 to 10:1.

A fourth embodiment provides an adhesive composition which is similar to the one of the third embodiment discussed above with the exception that it does not contain the first non crosslinked polymer.

In a preferred embodiment of the present technology, the first polymer of the adhesive is selected from the group of polyalkenoic acids and mixtures thereof.

Also the second polymer of the adhesive layer composition is preferably selected from the group of cross linked polyalkenoic acids and mixtures thereof. Suitable examples of polyalkenoic acids are represented by polyacrylic acid.

As discussed above, in one embodiment, the adhesive layer comprises a first water-soluble, non crosslinked polymer and a second crosslinked polymer which is a superabsorbent. Further, the superabsorbent is preferably present in the form of discrete portions (e.g. particulate portions) capable of absorbing water and of swelling to a diameter greater than the thickness of the remaining adhesive layer.

The discrete superabsorbent portions are typically randomly distributed throughout the adhesive layer, but the mixture can be designed such that the crosslinked portion resides in a particular location, for example, preferentially on top.

Generally, a "superabsorbent" is a polymer that is capable of absorbing and retaining very high quantities of liquid as compared to its own weight. The liquid is usually but not necessarily water and the term "retaining [ . . . ] liquid" indicates a level of affinity and resistance to release the absorbed liquid which is characteristic for a superabsorbent.

In the present context, the term "superabsorbent" is in particular used for designating a property of a cross-linked or partially cross-linked polymer, typically a polymer which is water soluble in non-cross-linked condition, of swelling on contact with water by absorption of the water and by exhibiting in an aqueous dispersion an increased viscosity. The crosslinked polymer is formed into superabsorbent portions capable of absorbing water and swelling into a diameter greater that the thickness of the adhesive layer.

In preferred embodiments of the present technology, superabsorbents are defined as polymers having the ability to absorb 20 to 500 times, for example about 50 to 150, preferably about 100±10 times its weight of the polymer when exposed to liquid water. They are reversibly swellable, i.e. the polymers will swell upon wetting and shrink upon drying.

In one embodiment, the viscosity of a 10% aqueous dispersion (calculated from the total weight of the dispersion) of a polymeric superabsorbent of the present kind is greater than 3000 cps at room temperature.

The superabsorbent component of the present adhesive is capable of swelling to a diameter greater than the thickness of the remaining adhesive layer. It is also capable of shrinking when water is removed for example by evaporation.

As discussed above, in a preferred embodiment, the adhesive composition is produced by mixing a water-soluble polymer with a crosslinking agent; and by restricting crosslinking of the water-soluble polymer so as to form a composition comprising a first non crosslinked polymer component and a second crosslinked polymer component which acts as a superabsorbent.

The step of restricting crosslinking of the water-soluble polymer can be carried out
  by adding a smaller amount of crosslinking agent than required for complete crosslinking; or
  by keeping the temperature of the crosslinking lower than required for complete crosslinking; or
  by a combination of the two previous steps.

As evident from the foregoing, the present adhesives, which are based on superabsorbency, clearly differ from conventional adhesives based on the use of swellable polymers, e.g. of the NaCMC kind.

Preferably, the crosslinking agent is selected from crosslinking agents capable of complexing with the functional groups of a water soluble polymer. Examples of such crosslinking agents are agents comprising a metal, preferably a transition metal, particularly preferably zirconium, zinc, chromium or iron or mixtures thereof.

Thus, one embodiment of the present technology comprises providing a suitable adhesive layer via a water soluble polymer having reactive functional groups, such as polyacrylic acid (PAA), which is mixed with a limited amount of a crosslinking agent selected from the group of complexing di- and trivalent crosslinking salts, aziridine, and ions (ammonium zirconyl carbonate (AZC), zirconium salts, zinc salts, chromium salts, and combinations of ferric aluminum). The crosslinking agent complexes with the functional groups on the water soluble polymer once the water has been removed to avoid high viscosity.

In one embodiment, the crosslinking agent of the adhesive layer composition is added in an amount of less than 5 wt % of the first polymer component, preferably 0.1 to 4 wt-% of the first polymer component (the non-cross-linked polymer), most preferably 1 to 4 wt-%, for example 2 to 3 wt-% of the first polymer component. In one specific example, ammonium zirconyl carbonate is added in a ratio of 1 to 4% by weight of a water based on the polyacrylic acid solution.

Other additives can be incorporated into the adhesive coating solution to modify the end properties of the adhesive coating. Such additives can be selected from the group of plasticizers, for example waste based plasticizers, for improving flexibility, minerals, such as clay, talc and $TiO_2$, to reduce adhesion and shrinkage, and pigments to add color, and combinations thereof.

Based on the above, in a particular embodiment a wall covering is provided which is formed by a porous substrate sheet having a front and a back that faces opposite the front, said sheet exhibiting a water resistant or water impermeable, vapour permeable bather layer applied on and attached to the back of the sheet and, adhered to the bather, an adhesive layer having portions capable of expanding with water.

As mentioned above, the adhesive composition can be applied onto the substrate by conventional industrial applicators and application techniques. Thus, in a preferred embodiment, the adhesive composition is applied to the bather layer by an application means selected from the group consisting of gravure, roll coat, Meyer rod and saturation, screen, spray, blade and air knife.

The novel wall covering can be used for covering various wall surfaces selected from (the non-exclusive list of) brick, wood, glass, concrete, plasterboard, chipboard, stone and polymer. The surface can, naturally, be pretreated, for example sealed or primed, preferably with a polymeric substance, such as to improve slip or strippability of the surface.

The working principle behind the present adhesive layer is that when it is exposed to a small amount of water the crosslinked polymer portion will rapidly absorb water and swell to a diameter greater than the thickness of the remaining layer. The randomly dispersed swollen portions (typically having a particulate form) will be between the wall surface and the wallcover limiting the amount of the non crosslinked polymer adhesive in contact with the wall. This factor allows the wallcover to glide along the wall surface.

Thus, based on the foregoing, in the method of covering a wall surface according to the present invention, first a wall covering of the above-described kind is provided. Then the adhesive layer is moistened or wetted. Moistening can be carried out by spraying the wall, spraying the wallcover or by a combination of both with water. The expandable portions of the adhesive are thereby allowed to swell. The wall covering is placed against the surface and contact between the wall covering is achieved primarily through the expanded portion with the wall at a position at a first point of time. If so desired or needed, the position of the sheet against the wall is changed during up to 30 minutes, preferably 1 to 20 minutes, in particular 5 to 10 minutes from the first point of time.

Typically, before applying the wall covering, water is sprayed on the wall in amounts of about 10 to 250 gsm, in particular about 50 to 200 gsm, for example about 70 to 180 gsm.

The following non-limiting examples illustrate the present technology.

Example 1

To achieve a repositionable adhesive coating an aqueous product comprising polyacrylic acid precursor (a water soluble monomer, preferably an alpha, beta-ethylenically unsaturated carboxylic acid monomer known commercially as PD8081H, supplied by HB Fuller) is mixed with a crosslinking agent, viz. ammonium zirconyl carbonate, AZC at room temperature.

The crosslinking agent is added in an amount which is insufficient to achieve complete complexation of the polyacrylic acid monomer.

FIG. 1 shows the resistance to glide and final adhesion as a function of the concentration of the crosslinking agent. The results were obtained at the following conditions:
  Water application: 130 gsm on the substrate
  3 minutes wetting time before application to the primed plasterboard
  Resistance to glide analyzed after 10 minutes
  Final adhesion analyzed after 28 h.

As apparent from the figure, by limiting the amount of AZC to the aqueous polyacrylic acid monomomer solution (PD8081H), it is possible to limit the amount of cross linking of the PAA and to adjust the final dried composition to a mix of crosslinked PAA ("x-PAA") and unreacted PAA, which gives particularly advantageous properties as an adhesive layer of the present final wallcover.

Thus, in one embodiment, at the conditions mentioned above in connection with FIG. 1, a wall covering according to the present technology exhibits a glide resistance of the adhesive of less than 1500 $Nm^{-2}$, in particular less than 1000 $Nm^{-2}$.

In one embodiment, at the conditions mentioned above in connection with FIG. 1, a wall covering according to the present technology exhibits a strength of the adhesive greater than 10.00 N/5 cm, in particular greater than 15.00 N/5 cm.

The composition, a mixture of PAA and x-PAA particles, does not exhibit high viscosity and avoids processing issues.

In particular, at levels of up to 4% of the AZC, only a part of the PAA will be complexed (crosslinked) leaving a water soluble PAA component in mixture with a super absorbent x-PAA component.

Typically, the non-complexed polyacrylic monomer component does not contribute to increase in viscosity, allowing a possibility to control the viscosity of the adhesive formulation for better processing and easier application (PD8081H). In an embodiment, viscosity of a solution of the above kind is below 2000 cps at 25% (r.t.) solids and significantly contrasts the rheology of dual component water based systems comprised of mixtures of PAA and xPAA particles. (Such may have viscosities much greater than 3500 cps at 10% solids (r.t.)).

In one test it was found that by using 98 parts by weight of PD8081H and 2 parts by AZC, it was possible to achieve an even more readily coatable adhesive system at higher solids making less water required to be removed in order to completely dry the solution. This reduced drying demand as well as increases line speeds and productivity.

The composition can be applied on a web or sheet by metering/Mayer Rod, gravure, air knife, or gravure, for example.

Example 2

A strippable, repositionable wall cover web was produced as follows:

A 130 gms nonwoven wall cover grade was employed as base substrate. On the back side of the base substrate, a precoating was applied using a pre-coating formulation. The formulation had the following composition:
  30% of Rhoplex E 3482 (Dow), acrylic latex
  70% of Barrisurf HX (Imerys), very high aspect ratio clay
  The coating was prepared to a solids content of 64%. The coat weight was 10 gms. Drying of the coated web was carried out at increased temperature (130° C.).

Figure 2:
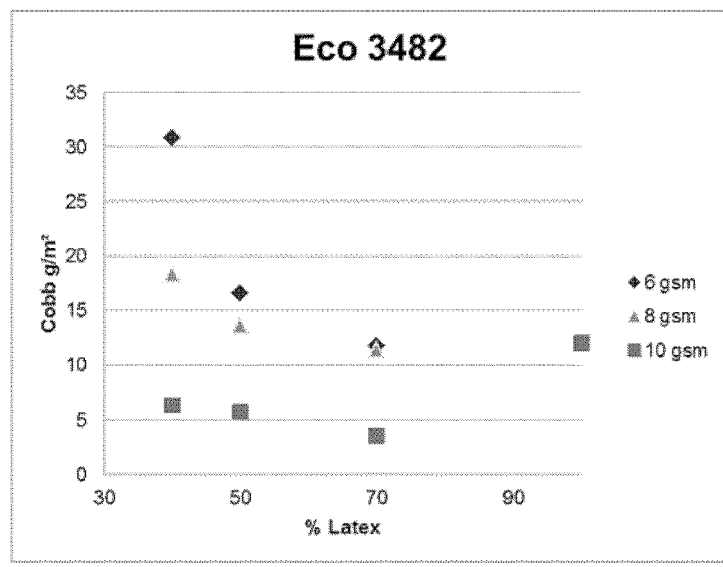
FIG. 2 shows water transmission/absorption to a coated base substrate measured as Cobb (1 min).

The water transmission/absorption to the base substrate measured as Cobb (1 min). The results are given in FIG. 2.

As apparent from the figure, a pre-coating consisting of the latex Rhoplex E 3482 and clay, Barrisurf HX, forms an effective bather coating.

On the pre-coated web, thus obtained, a top coating was applied.

The top coating was an aqueous dispersion with the active component composition of:
  97% of PD8081H (HP Fuller)
  3% of Bacote 20 (MEL Chemicals), Ammonium Zirconyl Carbonate cross linker.

The coating was prepared to solids of 20%. The coat weight was 10 gsm. The coated web was dried at 130° C.

The properties of the adhesive layer will appear from FIG. 1 (cf. test point at 3%).

INDUSTRIAL APPLICABILITY

The present technology can be employed for the manufacture of low viscosity adhesive coatings for repositionable wall covers. In particular it can be employed for manufacturing wall covers with dry adhesive layers on the back side. Such products can be manufactured online, for example on a wall paper machine. The wall covers can be utilized as traditional wall papers for decorative purposes, domestically and in public spaces, in dry or humid spaces. Depending on the constitution and composition of the substrate layer, the present wall covers can also be used for technical purposes, e.g. for reinforcing or modifying the properties of wall surfaces, such as for improving impacts strength of brittle panels, such as gypsum boards, or for modifying acoustic properties of hard surfaces, such as wood, plywood or concrete panels and boards.

CITATION LIST

Patent Literature

U.S. Pat. No. 4,355,074
U.S. Pat. No. 4,361,452
U.S. Pat. No. 4,476,190
WO2000/031201
EP 0 194 857
U.S. Pat. No. 4,639,395
WO 95/27826
WO 2005/095712
U.S. Pat. No. 3,883,269

The invention claimed is:

1. A wall covering comprising:
    a planar substrate having a front, and a back facing opposite the front;
    a barrier layer on the back; and
    an adhesive layer, having a thickness, on the barrier layer; wherein
    the adhesive layer comprises a first polymer component and a second polymer component, the first polymer component being a non-crosslinked polymer and said second polymer component being a crosslinked polymer exhibiting properties of superabsorbency,
    said crosslinked polymer being a reversibly swellable polymer, which has the ability to absorb about 20 to 500 times its weight when exposed to liquid water, and wherein the barrier layer is permeable to water vapor and exhibits a permeability.

2. The wall covering according to claim 1, wherein a weight ratio between the first polymer component and the second polymer component is 1:100 to 100:1.

3. The wall covering according to claim 1, wherein the first polymer component comprises a water soluble polymer.

4. The wall covering according to claim 1, wherein the adhesive layer is formed from a water borne adhesive having a viscosity at room temperature of less than 2000 cps at 25% solids.

5. The wall covering according to claim 1, wherein the substrate is selected from the group consisting of nonwoven substrates, papers, and boards.

6. The wall covering according to claim 5, wherein the second polymer component is located in discrete portions of the adhesive layer, the discrete portions capable of absorbing water and of swelling to a diameter greater than a thickness of other portions of the adhesive layer which do not include the discrete portions, upon wetting of the adhesive layer.

7. The wall covering according to claim 1, wherein the thickness of the adhesive layer is 0.01 to 2.0 mm.

8. The wall covering according to claim 1, wherein the second polymer component is selected from polymers which are soluble in water in a non-crosslinked state.

9. The wall covering according to claim 1, wherein said second polymer is crosslinked with a crosslinking agent capable of complexing with functional groups of the second polymer component.

10. The wall covering according to claim 1, wherein said second polymer component is crosslinked with a crosslinking agent selected from crosslinking agents comprising a metal.

11. The wall covering according to claim 1, wherein the barrier layer is impermeable to water but permeable to vapor.

12. The wall covering according to claim 1, wherein the barrier layer comprises a crosslinked polymer and 5 to 70% by weight of a pigment selected from pigments having an aspect ratio of 60 to 200.

13. The wall covering according to claim 1, wherein the barrier layer comprises pigments selected from the group consisting of clay, talc, and combinations thereof.

14. The wall covering according to claim 1, wherein the barrier layer has a COBB60 value in a range of 3-130 gsm determined using T441 om-90.

15. The wall covering according to claim 1, wherein the substrate comprises fibres selected from the group consisting of natural fibres, synthetic fibres, and mixtures thereof.

16. The wall covering according to claim 1,
    wherein the planar substrate comprises a porous substrate sheet.

17. The wall covering according to claim 1, wherein the dry adhesive layer has an essentially non-tacky surface feel when dry.

18. The wall covering according to claim 1, wherein a weight ratio between the first polymer component and the second polymer component is 1:50 to 50:1.

19. The wall covering according to claim 1, wherein a weight ratio between the first polymer component and the second polymer component is 1:10 to 10:1.

20. The wall covering according to claim 1, wherein the substrate is selected from the group consisting of nonwoven substrates, papers, and boards, and wherein the substrate is in a form of a sheet or web.

21. The wall covering according to claim 1, wherein the thickness of the adhesive layer is 0.05 to 1 mm.

22. The wall covering according to claim 1, wherein the first polymer component is selected from water soluble polymers which contain ionic or ionizable functional groups or functional groups capable of hydrogen bonding, or combinations thereof.

23. The wall covering according to claim 1, wherein the first polymer component comprises a non-crosslinked polyalkenoic acid and the second polymer component comprises a crosslinked polyalkenoic acid.

24. The wall covering according to claim 1, wherein the second polymer component is selected from polymers which contain ionic or ionizable functional groups.

25. The wall covering according to claim 24, wherein the ionic or ionizable functional groups comprise a member selected from the group consisting of metal carboxylates, carboxylic acids, ammonium halides, amino groups, and combinations thereof.

26. The wall covering according to claim 1, wherein the second polymer component comprises a crosslinked polyalkenoic acids.

27. The wall covering according to claim 26, wherein the second polymer component is crosslinked with a crosslinking agent capable of complexing with functional groups of the polyalkenoic acid.

28. The wall covering according to claim 1, wherein the second polymer component is crosslinked with a crosslinking agent selected from crosslinking agents comprising a transition metal.

29. The wall covering according to claim 1, wherein said second polymer component is crosslinked with a crosslinking agent selected from crosslinking agents comprising zirconium, zinc, chromium, iron, and mixtures thereof.

30. The wall covering according to claim 1, wherein the barrier layer is impermeable to water but permeable to vapor, and wherein the barrier layer exhibits a permeability, characterized by a Tappi TM 161 Gurley Air Porosity value of 1-150 L/min/100 cm$^2$.

31. The wall covering according to claim 1, wherein the barrier layer is impermeable to water but permeable to vapor, and wherein the barrier layer exhibits a permeability, characterized by a Tappi TM 161 Gurley Air Porosity value of 8-20 L/min/100 cm$^2$.

32. The wall covering according to claim 1, wherein the barrier layer comprises pigments selected from the group of kaolin clay, engineered clay, talc, and combinations thereof.

33. The wall covering according to claim 1, wherein the barrier layer has a COBB60 value in a range of 15-50 gsm, determined using T441 om-90.

34. The wall covering according to claim 1, wherein the second polymer component exhibiting properties of superabsorbency has the ability to absorb about 50 to 150 times its weight when exposed to liquid water.

35. The wall covering according to claim 1, wherein the second polymer component exhibiting properties of superabsorbency has the ability to absorb about 100±10 times its weight when exposed to liquid water.

* * * * *